United States Patent
Katta et al.

(10) Patent No.: US 12,292,652 B1
(45) Date of Patent: May 6, 2025

(54) USER-ADJUSTABLE COLOR MIXING BACKLIGHT FOR TRANSFLECTIVE DISPLAY

(71) Applicant: Daylight Computer Co., Fremont, CA (US)

(72) Inventors: Anjan Katta, San Francisco, CA (US); Ibrahim Iskender Kushan, Los Angeles, CA (US)

(73) Assignee: Daylight Computer Co., Fremont, CA (US)

( * ) Notice: Subject to any disclaimer, the term of this patent is extended or adjusted under 35 U.S.C. 154(b) by 0 days.

(21) Appl. No.: 18/584,698

(22) Filed: Feb. 22, 2024

(51) Int. Cl.
*G02F 1/1335* (2006.01)
*G02F 1/13357* (2006.01)

(52) U.S. Cl.
CPC .. *G02F 1/133612* (2021.01); *G02F 1/133603* (2013.01)

(58) Field of Classification Search
CPC .............. G02F 1/133612; G02F 1/133603
USPC .......................................................... 349/114
See application file for complete search history.

(56) References Cited

U.S. PATENT DOCUMENTS

| | | | | |
|---|---|---|---|---|
| 2006/0097978 A1* | 5/2006 | Ng | ........................ | G09G 3/3413 345/207 |
| 2014/0055037 A1* | 2/2014 | Kurita | ................. | G02F 1/13318 362/296.01 |
| 2015/0131141 A1* | 5/2015 | Nakahara | .......... | G02F 1/133621 359/296 |
| 2017/0338624 A1 | 11/2017 | Takiguchi | | |
| 2021/0215857 A1 | 7/2021 | Nichol | | |

OTHER PUBLICATIONS

Fukushima, Hiroki, et al. 'Diffuse Reflected Light Control for Reflective Tablet Display by Combining Use of Anisotropic and Isotropic Light-Diffusing Films'. Digest of Technical Papers—SID International Symposium, vol. 54, No. 1, 2023, pp. 841-844, https://doi.org10.1002/sdtp.16695.

Itoh, Yasuhisa, et al. 'Influence of Rough Surface upon Optical Characteristics of Reflective LCD with a Polarizer'. SID Symposium Digest of Technical Papers, vol. 29, 05 1998, (4 pages) https://doi.org10.1889/1.1833733.

\* cited by examiner

*Primary Examiner* — Charles S Chang
(74) *Attorney, Agent, or Firm* — Esplin & Associates, PC

(57) ABSTRACT

Some implementations pertain to a transflective display device comprising a display surface, an optical path, and/or other components. The optical path may spatially modulate light emitted from a primary light source and direct it to the display surface, generating a display of visual information. The optical path may include a reflective spatial light modulator and a set of Light Emitting Diodes. The modulator may receive light from the primary light source and selectively reflect it toward the display surface. The Light Emitting Diodes may emit light directed to the backside of the modulator, including white light and light of a first color. Some implementations may include drivers to control the intensity of the light emitted by the Light Emitting Diodes, dictating the tone of the light transmitted through the modulator. This configuration may facilitate the creation of a uniform, high-quality display.

20 Claims, 5 Drawing Sheets

USER-ADJUSTABLE COLOR MIXING BACKLIGHT FOR TRANSFLECTIVE DISPLAY

FIELD OF THE DISCLOSURE

The present disclosure generally relates to display technology, and more particularly to the uniformity and color consistency of backlit displays.

BACKGROUND

Transflective display devices are widely used in various applications due to their ability to operate under different lighting conditions. These devices typically include a display surface and a light source. The light from the source is spatially modulated and directed toward the display surface to generate visual information. However, conventional transflective displays often use a single-color backlight, which can limit the quality and versatility of the displayed images. Furthermore, these displays often struggle with maintaining contrast, particularly in low-light conditions, as the backlight shines on both the black and white elements of the display, washing out the contrast.

SUMMARY

The subject disclosure provides for user-adjustable color mixing backlight for transflective displays. Existing reflective display devices may often fail to provide high-quality images with good contrast, particularly in low-light conditions. This may be primarily due to the use of a single-color backlight, which may limit the range of colors that can be displayed. Additionally, the backlight in these devices may shine on both the dark and light elements of the display, reducing the contrast and making the images appear washed out. This issue may be further exacerbated in dimmer light settings, where the lack of sufficient light may make the display appear less bright and may reduce the overall user experience.

One aspect of the present disclosure relates to a transflective display device. The transflective display device may include a display surface, an optical path, and/or other components. The optical path may be configured to spatially modulate light received from a primary light source, and to direct the spatially modulated light to the display surface, thereby generating a display of visual information on the display surface. The primary light source may include ambient light and/or other sources of light. The reflective spatial light modulator may have a modulating side and a backside opposite the modulating side. The reflective spatial light modulator may be configured to receive light emitted from the primary light source at the modulating side, and to spatially modulate the received light by selectively reflecting the light at separately addressable positions on the modulating side along the optical path toward the display surface. The reflective spatial light modulator may be configured to at least partially transmit light received at the backside such that light transmitted through the backside is introduced to the optical path and directed toward the display surface with the light emitted by the primary light source and selectively reflected by the reflective spatial light modulator from the modulating side. The set of LEDs may be configured to emit light that is directed to the backside of the reflective spatial light modulator. The set of LEDs may include a first group of LEDs that emit white light and a second group of LEDs that emit light having a first color. One or more drivers may be configured to drive the set of LEDs such that the relative intensity of the light emitted by the first group of LEDs and the second group of LEDs is configurable via a control signal, thereby facilitating the control signal to dictate the tone of the light emitted by the set of LEDs and transmitted through the reflective spatial light modulator.

According to some implementations, the tone of the light emitted by the set of LEDs and transmitted through the reflective spatial light modulator may impact the tone of the display of visual information generated on the display surface.

According to some implementations, the first color may be amber.

According to some implementations, adjustment of the tone of light emitted by the set of LEDs may not impact the tone of the light emitted by the primary light source.

According to some implementations, the set of LEDs may be arranged in a rectangle. Along the sides of the rectangle individual ones of the LEDs in the first group of LEDs may be interleaved with individual ones of the LEDs in the second group of LEDs.

According to some implementations, individual ones of the LEDs from the second set of LEDs arranged at or near corners of the rectangle may be driven to emit light at an intensity relatively higher than the LEDs from the second set of LEDs along the sides of the rectangle to provide uniformity across the display surface in the tone of the light from the set of LEDs that is transmitted to the display surface.

According to some implementations, the LEDs from the second set of LEDs arranged along the individual sides of the rectangle may be driven together.

According to some implementations, the LEDs from the first set of LEDs may be driven together.

According to some implementations, the LEDs from the set of LEDs that are arranged at or near the corners of the rectangle may be driven separately from the LEDs from the second set of LEDs arranged along the individual sides of the rectangle. Individual ones of the LEDs from the set of LEDs that are arranged at or near the corners of the rectangle may emit a combination of white light and light of the first color. The combination of white light and light of the first color may facilitate consistent brightness between the areas at or near corners of the rectangle and the sides of the rectangle.

According to some implementations, the transflective display device may further include a user interface configured to receive user entry and/or selection of the tone of the light emitted by the set of LEDs such that the control signal that dictates the tone of the light emitted by the set of LEDs is generated based on the received user entry and/or selection of the tone of light.

According to some implementations, the primary light source and the reflective spatial light modulator may be configured such that the display of visual information displayed on the display surface is monochromatic.

According to some implementations, the reflective spatial light modulator may be a transflective liquid crystal device.

Another aspect of the disclosure relates to a method for using a transflective display device. The method may include receiving user input to adjust the relative intensity of the light emitted by the first group of LEDs and the second group of LEDs. The method may include generating a control signal based on the user input. This user input could be a manual adjustment made by the user or an automatic adjustment based on environmental conditions or user preferences. The method may include transmitting the control signal to the one or more drivers to adjust the relative intensity of the light emitted by the first group of LEDs and the second group of LEDs, thereby changing the tone of the light emitted by the set of LEDs and transmitted through the reflective spatial light modulator. The method may include directing the light emitted by the set of LEDs to the backside of the reflective spatial light modulator. The method may include spatially modulating the light received at the modulating side of the reflective spatial light modulator by selectively reflecting the light at separately addressable positions on the modulating side along the optical path toward the display surface. The method may include transmitting the light received at the backside of the reflective spatial light modulator through the backside and introducing it to the optical path, thereby directing it toward the display surface with the light emitted by the primary light source and selectively reflected by the reflective spatial light modulator from the modulating side.

These and other features and characteristics of the present technology, as well as the methods of operation and functions of the related elements of structure and the combination of parts and economies of manufacture, will become more apparent upon consideration of the following description and the appended claims concerning the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context dictates otherwise.

DETAILED DESCRIPTION

Figure 1:
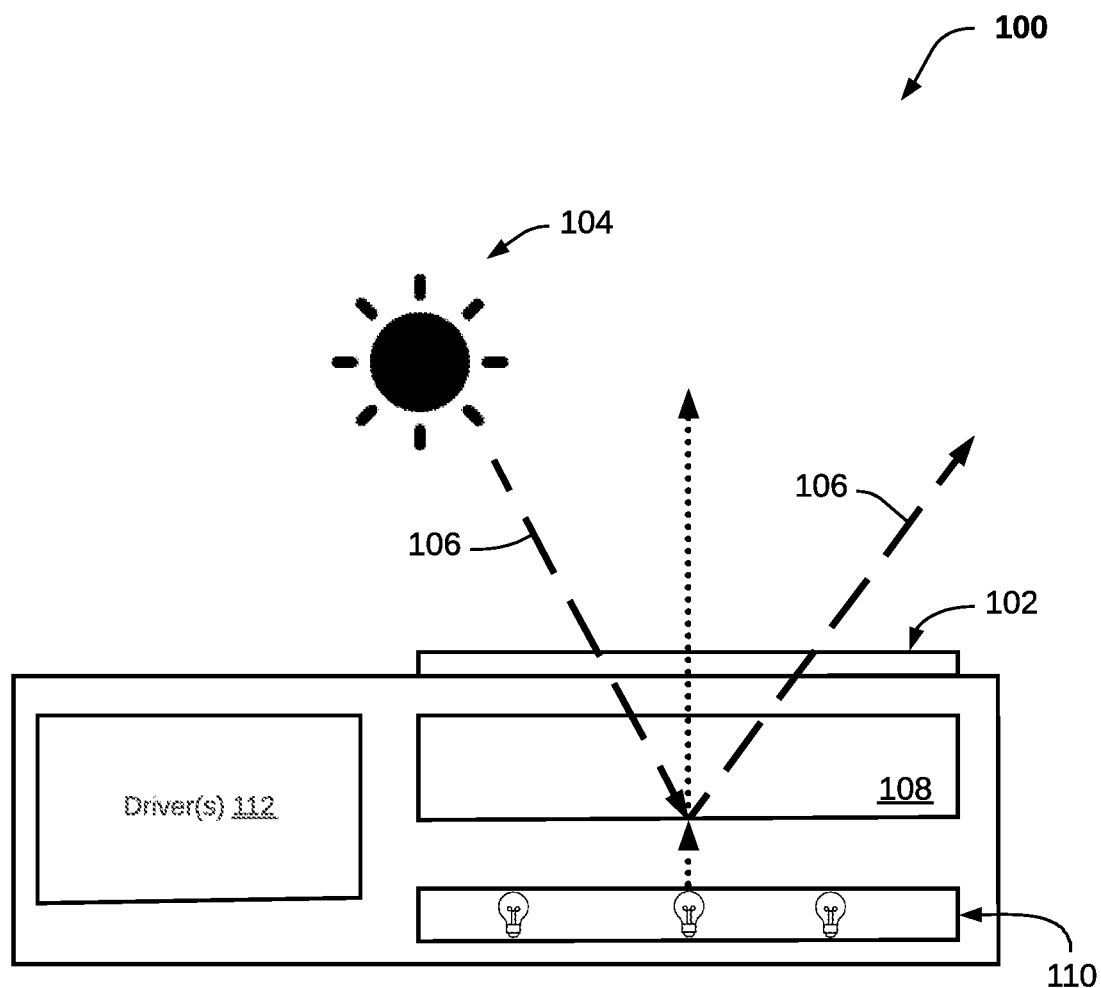
FIG. 1 is a schematic illustration of an exemplary transflective display device, by some implementations.

Some implementations may involve a display device that could be characterized as transflective. This kind of display device may encompass a display surface, an optical path, and/or other components. The display surface may be the region where visual information is presented to the user. The primary light source may serve as the main source of light that illuminates the display surface. The primary light source may include ambient light and/or other sources of light. The optical path may be engineered to modulate light emitted from the primary light source and direct this modulated light to the display surface. The modulation of light may involve altering its properties such as intensity or direction. Guiding the modulated light to the display surface may involve directing the light along a specific path to reach the display surface. This process may lead to the generation of visual information on the display surface. The visual information may be any data or images that the user needs to see on the display surface.

The optical path in these implementations may incorporate a reflective spatial light modulator. This modulator may possess a modulating side and a backside opposite the modulating side. The modulating side may be the side that receives and reflects light, while the backside may be the side that transmits light. The modulator may be designed to receive light emitted from the primary light source at the modulating side. The light received at the modulating side may be the light that is to be modulated and reflected toward the display surface. It may then spatially modulate the received light by selectively reflecting the light at separately addressable positions on the modulating side along the optical path toward the display surface. Spatial modulation may involve altering the properties of light at different positions on the modulating side. Selectively reflecting the light may involve controlling which parts of the light are reflected and which parts are not.

The reflective spatial light modulator may be designed to at least partially transmit light received at the backside. This implies that light transmitted through the backside may be introduced to the optical path and directed toward the display surface. The light transmitted through the backside may be extra light that is used to enhance the brightness or color of the display. This light may be combined with the light emitted by the primary light source that has been selectively reflected by the reflective spatial light modulator from the modulating side. The combination of these two types of light may result in a brighter display.

Certain implementations may incorporate a set of light-emitting diodes (LEDs). These LEDs may be designed to emit light that is directed to the backside of the reflective spatial light modulator. The LEDs may be small electronic devices that produce light when an electric current is passed through them. The light emitted by the LEDs may be used to enhance the brightness or color of the display. The set of LEDs may include a first group of LEDs that emit white light and a second group of LEDs that emit light of a certain color. The white light may be used to provide a neutral background for the display, while the colored light may be used to add color to the display.

The relative intensity of the light emitted by the first group of LEDs and the second group of LEDs may be configurable via a control signal. The control signal may be an electronic signal that controls the operation of the LEDs. This may allow the control signal to dictate the tone of the light emitted by the set of LEDs and transmitted through the reflective spatial light modulator. The tone of the light may refer to its color or brightness, which may be adjusted to suit the user's preferences or the requirements of the display.

Lastly, certain implementations may incorporate one or more drivers. These drivers may be designed to drive the set of LEDs. The drivers may be electronic devices that control the operation of the LEDs. This may enable the control signal to dictate the tone of the light emitted by the set of LEDs and transmitted through the reflective spatial light modulator. The drivers may ensure that the LEDs operate correctly and produce the desired tone of light.

FIG. 1 is a schematic illustration of an exemplary transflective display device 100, in accordance with some implementations. This transflective display device 100 may be a device that is capable of both transmissive and reflective operations. Transmissive operations may involve the transmission of light through the device, while reflective operations may involve the reflection of light off the device. As shown in FIG. 1, the transflective display device 100 may include one or more of a display surface 102, a primary light source 104, an optical path 106, a reflective spatial light modulator 108, a set of light-emitting diodes (LEDs) 110, one or more drivers 112, and/or other components. These components may work together to create a display that can operate in both transmissive and reflective modes.

The display surface 102 may be the part of the device where visual information is displayed. This visual information may include text, images, videos, or any other type of visual content. The display surface 102 may be made of a material that allows light to pass through it, such as glass or plastic. Glass and plastic are materials that are often used in display devices due to their transparency and durability. The display surface 102 may be flat or curved. The display surface 102 may be of any size suitable for displaying visual information. The shape and size of the display surface 102 may depend on the specific application of the transflective display device 100.

The primary light source 104 may include ambient light and/or other sources of light.

The optical path 106 may be a path along which light received from the primary light source 104 travels to the display surface 102 within the transflective display device 100. This path may ensure that the light reaches the display surface 102 in the desired manner. The optical path 106 may be a physical path, such as a fiber optic cable, or may be a path defined by the alignment of components in the transflective display device 100. A fiber optic cable is a type of cable that can transmit light along its length. The optical path 106 may be straight or curved, and may be of any length suitable for directing light from the primary light source 104 to the display surface 102. The shape and length of the optical path 106 may be determined by the design of the transflective display device 100.

The reflective spatial light modulator 108 may be a component that modulates light by selectively reflecting it. This selective reflection may be used to create the desired image on the display surface 102. The reflective spatial light modulator 108 may have a modulating side and a backside opposite the modulating side. The modulating side may be the side that interacts with the light from the primary light source 104. The reflective spatial light modulator 108 may be configured to receive light emitted from the primary light source 104 at the modulating side, and to spatially modulate the received light by selectively reflecting the light at separately addressable positions on the modulating side along the optical path 106 toward the display surface 102. This spatial modulation may be used to create the desired image on the display surface 102.

The set of LEDs 110 may be a group of LEDs. LEDs are a type of light source that are known for their efficiency and longevity. The set of LEDs 110 may include a first group of LEDs that emit white light (or other color) and a second group of LEDs that emit light of a first color, which may be different from the color emitted by the first group of LEDs. The use of different colors of LEDs may allow for a wider range of colors to be displayed on the display surface 102. The set of LEDs 110 may be configured to emit light that is directed to the backside of the reflective spatial light modulator 108. This light may be used to illuminate the display surface 102.

The one or more drivers 112 may be components that drive the set of LEDs 110. These drivers may control the operation of the LEDs, including their intensity and color. The one or more drivers 112 may be configured to control the intensity of the light emitted by the set of LEDs 110. The intensity of the light may be adjusted to create the desired level of brightness on the display surface 102. The one or more drivers 112 may receive a control signal that dictates the tone of the light emitted by the set of LEDs 110 and transmitted through the reflective spatial light modulator 108. This control signal may be generated by a controller (not shown) that is part of the transflective display device 100.

Figure 2A:
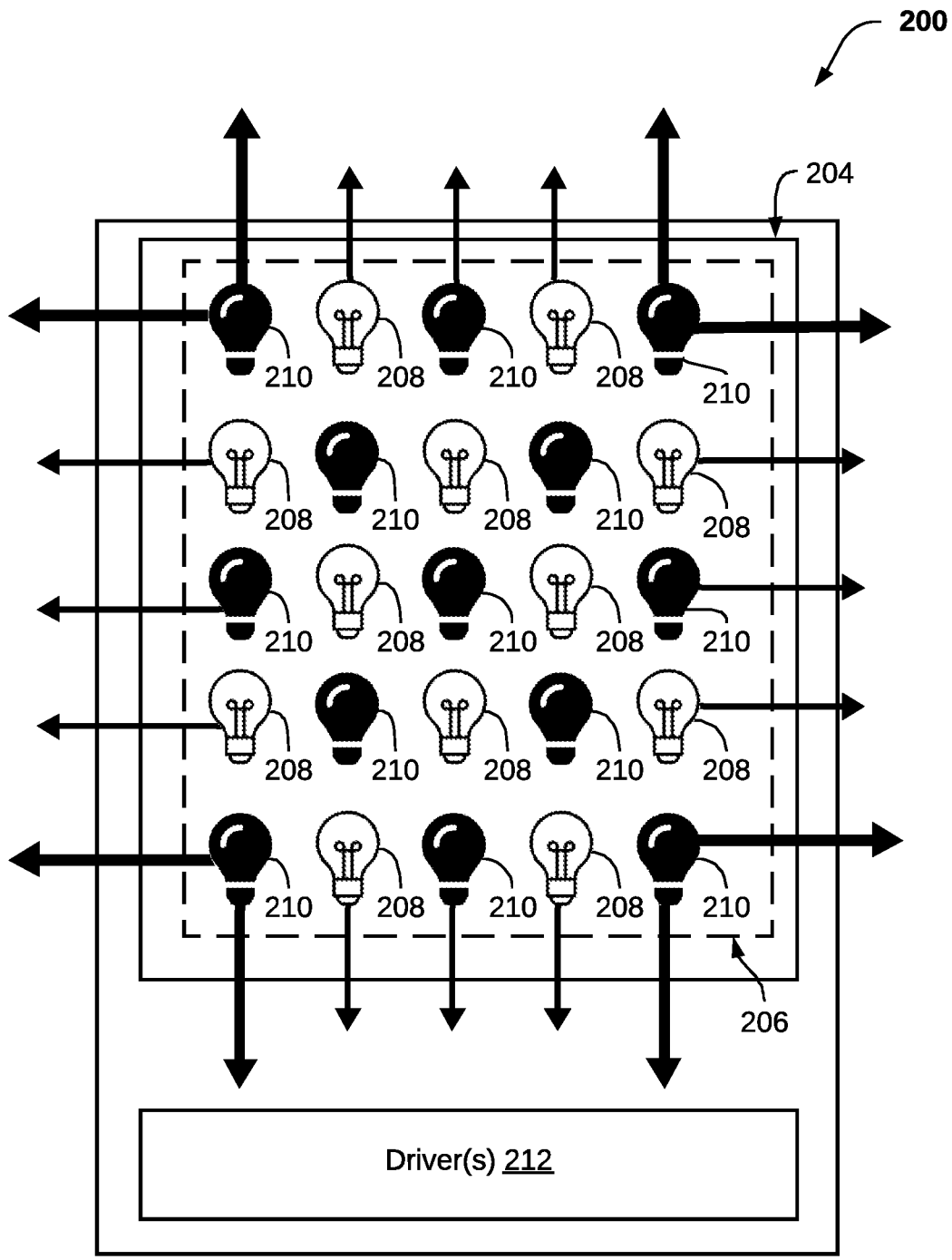
FIGS. 2A-B illustrate an exemplary arrangement of a set of LEDs to provide backlighting to a transflective display device that facilitates a tunable tone of visual information displayed on the transflective display device, by some implementations.
Figure 2B:
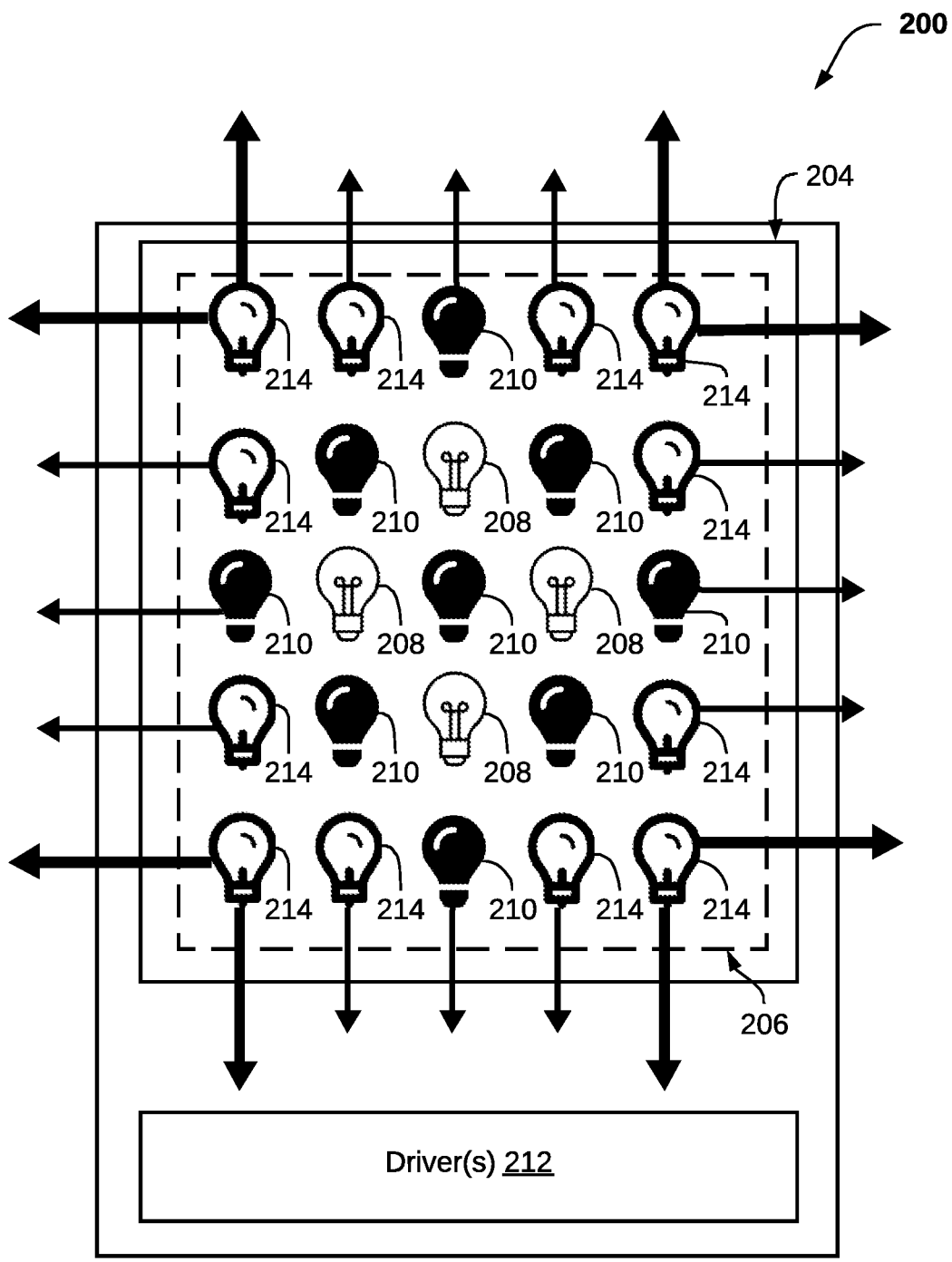

FIGS. 2A-B illustrate an exemplary arrangement 200 of a set of LEDs to provide backlighting to a transflective display device that facilitates a tunable tone of visual information displayed on the transflective display device, in accordance with some implementations. This arrangement 200 may be designed to provide a specific type of backlighting to a display device. The tunable tone of visual information may refer to the ability to adjust the color and intensity of the light emitted by the LEDs.

As shown in FIG. 2A, the arrangement 200 may include one or more of a reflective spatial light modulator 204, a set of LEDs 206, a first group of LEDs 208, a second group of LEDs 210, one or more drivers 212, and/or other components. The set of LEDs 206 may be configured to emit light that is directed to the backside of the reflective spatial light modulator 204. This configuration may ensure that the light emitted by the set of LEDs 206 reaches the backside of the reflective spatial light modulator 204.

The set of LEDs 206 may include the first group of LEDs 208 and the second group of LEDs 210. These two groups of LEDs may emit light of different colors and intensities. The first group of LEDs 208 may emit white light. This white light can be used to provide a neutral backlighting to the display device. The second group of LEDs 210 may emit light having a first color. This colored light can be used to provide a specific tone to the visual information displayed on the display device.

The set of LEDs 206 may be arranged in a rectangle. Along the sides of the rectangle individual ones of the LEDs in the first group of LEDs 208 may be interleaved with individual ones of the LEDs in the second group of LEDs 210. This arrangement may allow for a balanced distribution of light across the display surface. Individual ones of the LEDs from the second group of LEDs 210 arranged at or near corners of the rectangle may be driven to emit light at an intensity relatively higher than the LEDs from the second group of LEDs 210 along the sides of the rectangle to provide uniformity across the display surface in the tone of the light from the set of LEDs 206 that is transmitted to the display surface. Individual ones of the LEDs from the second group of LEDs 210 arranged at or near corners of the rectangle may emit a combination of white light and light of the first color. The combination of white light and light of the first color may facilitate consistent brightness between the areas at or near corners of the rectangle and the sides of the rectangle.

The LEDs from the second group of LEDs 210 arranged along the individual sides of the rectangle may be driven together. The LEDs from the set of LEDs 206 that are arranged at or near the corners of the rectangle may be driven separately from the LEDs from the second group of LEDs 210 arranged along the individual sides of the rectangle. This driving arrangement may allow for more precise control over the intensity and tone of the light emitted by the set of LEDs 206. The LEDs from the first group of LEDs 208 are driven together. This driving arrangement may ensure that the white light emitted by the first group of LEDs 208 is uniform across the display surface.

One or more drivers 212 may be configured to drive the set of LEDs 206. These drivers may be responsible for controlling the operation of the set of LEDs 206. The one or more drivers 212 may control the relative intensity of the light emitted by the first group of LEDs 208 and the second group of LEDs 210 based on a control signal. This control signal may allow for the adjustment of the intensity of the light emitted by the two groups of LEDs. This may facilitate the control signal to dictate the tone of the light emitted by the set of LEDs 206 and transmitted through the reflective spatial light modulator 204. This dictation of tone may allow for the adjustment of the color and intensity of the light reaching the display surface of the display device.

As shown in FIG. 2B, the arrangement 200 may include a third set of LEDs 214 and/or other components. The third set of LEDs 214 may be positioned at or near the corners of the rectangle. Individual ones of the LEDs of the third set of LEDs 214 may emit a combination of white light and light of the first color. The combination of white light and light of the first color may facilitate consistent brightness between the areas at or near corners of the rectangle and the sides of the rectangle.

Figure 3:
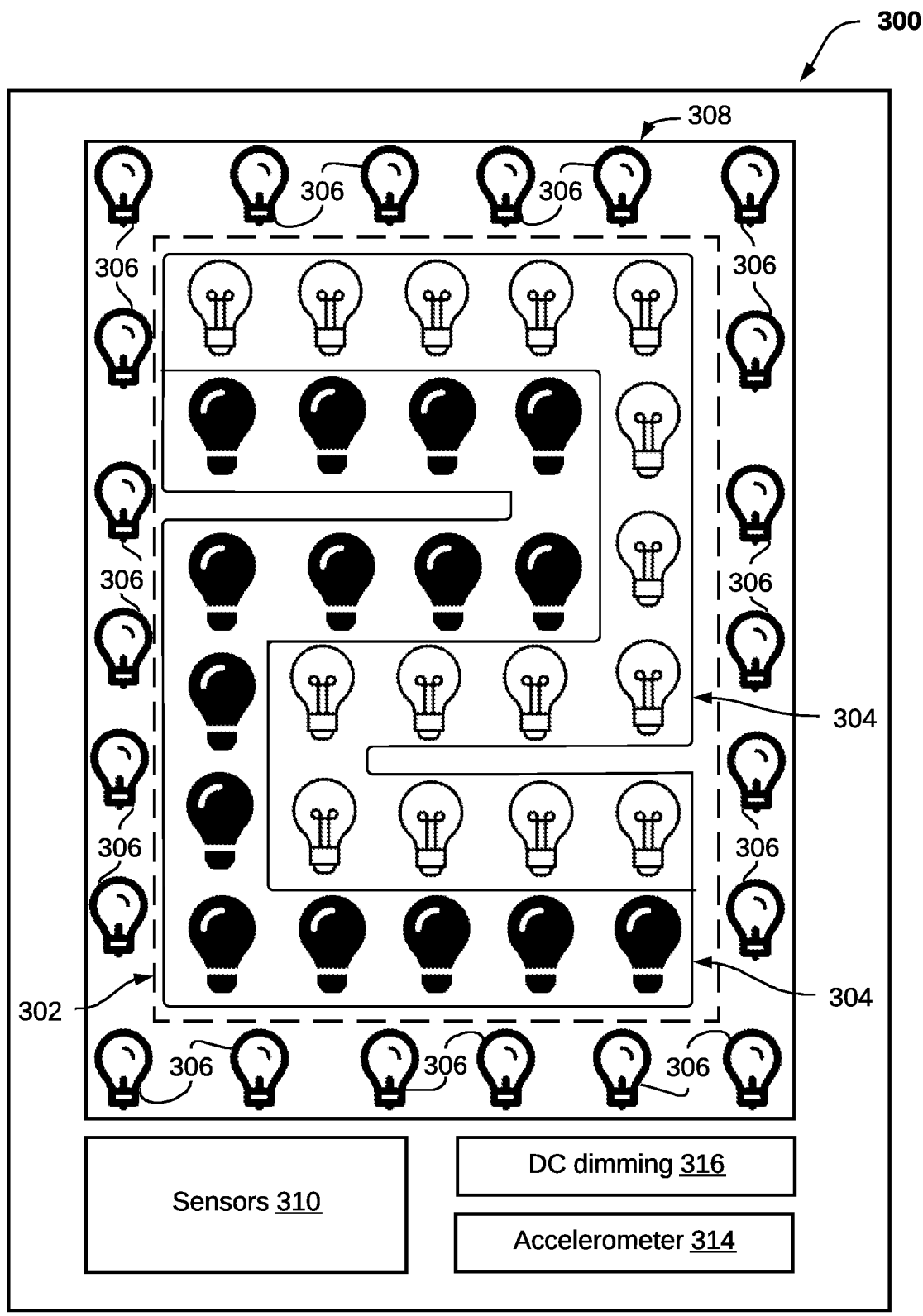
FIG. 3 illustrates how individual LEDs in a dual-color set of LEDs that provide backlighting to a transflective display device may be driven independently from other ones of the LEDs to provide uniformity of color of the backlighting at a display surface of the transflective display device, by some implementations.

FIG. 3 illustrates how individual LEDs in a dual-color set of LEDs that provide backlighting to a transflective display device 300 may be driven independently from other ones of LEDs in the dual-color set of LEDs to provide uniformity of color of the backlighting at a display surface of the transflective display device, in accordance with some implementations. In FIG. 3, the transflective display device 300 is shown with a dual-color set of LEDs 302, specifically amber and white, that may provide backlighting. The LEDs included in the set of LEDs 302 may be arranged in two separate chains 304. Each chain 304 may be independently addressable and driven separately. This may allow for the individual tuning of each LED of the set of LEDs 302, not just in terms of brightness but also in terms of tone, providing a high degree of control over the color mixing of the backlighting.

FIG. 3 also shows the placement of smaller arrays of color-specific LEDs 306 at the corners and edges of the transflective display device 300. This arrangement may be designed to achieve uniformity between colors across the display surface 308. The LEDs 302 may be distributed in a specific pattern to maintain this uniformity, as illustrated in the figure.

In addition, FIG. 3 shows how the LEDs 302 are dynamically adjusted based on sensor inputs to sensors 310. These sensors 310 may include an ambient light sensor and an RGB sensor, which may provide data on surrounding light conditions. This data may be used in a dynamic loop that selects the amber and white brightness levels for each LED of the set of LEDs 302. FIG. 3 also shows how accelerometer data recorded by an accelerometer 314 may be used to adapt the LED brightness to the likely viewing angle of the transflective display device 300.

Furthermore, FIG. 3 illustrates the use of DC (Direct Current) dimming 316 to control the brightness of the LEDs 302. This may allow for precise control over the brightness levels of each LED 302, further contributing to the uniformity of the backlighting.

Figure 4:
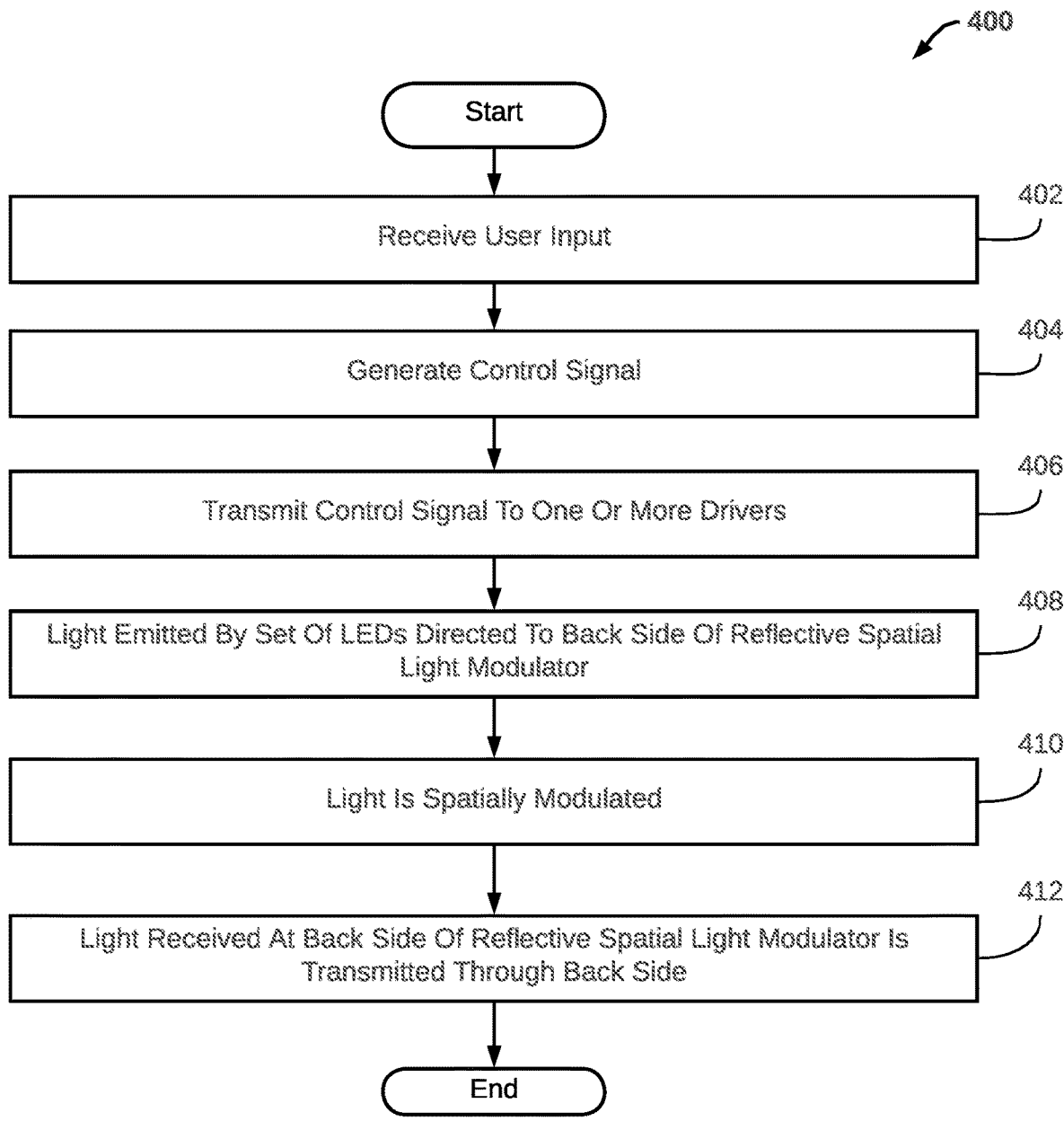
FIG. 4 illustrates a method of providing backlighting for a transflective display device that facilitates user control of the tone of visual information displayed at a display surface of the transflective display device, by some implementations.

FIG. 4 illustrates a method 400 of providing backlighting for a transflective display device that facilitates user control of the tone of visual information displayed at a display surface of the transflective display device, in accordance with some implementations. For explanatory purposes, the steps of the method 400 are described herein as occurring in serial, or linearly. However, multiple steps of the method 400 may occur in parallel.

At step 402, the method begins with receiving user input to adjust the relative intensity of the light emitted by the first group of LEDs and the second group of LEDs. This user input could be a manual adjustment made by the user or an automatic adjustment based on environmental conditions or user preferences.

At step 404, a control signal is generated based on the user input. This control signal is designed to adjust the relative intensity of the light emitted by the first group of LEDs and the second group of LEDs.

At step 406, the control signal is transmitted to one or more drivers. These drivers are responsible for adjusting the relative intensity of the light emitted by the first group of LEDs and the second group of LEDs, thereby changing the tone of the light emitted by the set of LEDs and transmitted through the reflective spatial light modulator.

At step 408, the light emitted by the set of LEDs is directed to the backside of the reflective spatial light modulator. This light is then spatially modulated at step 410 by selectively reflecting the light at separately addressable positions on the modulating side along the optical path toward the display surface.

At step 412, the light received at the backside of the reflective spatial light modulator is transmitted through the backside and introduced to the optical path. This directs it toward the display surface with the light emitted by the primary light source and selectively reflected by the reflective spatial light modulator from the modulating side. This results in the display of visual information with a user-controlled tone.

Although the present technology has been described in detail for illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A transflective display device, the device comprising:
   a display surface; and
   an optical path configured to spatially modulate light emitted from a primary light source, and to direct the spatially modulated light to the display surface, thereby generating a display of visual information on the display surface, wherein the optical path includes:
      a reflective spatial light modulator having a modulating side and a backside opposite the modulating side, wherein the reflective spatial light modulator is configured to receive light from the primary light source at the modulating side, and to spatially modulate the received light by selectively reflecting the light at separately addressable positions on the modulating side along the optical path toward the display surface, wherein the reflective spatial light modulator is further configured to at least partially transmit light received at the backside such that light transmitted through the backside is introduced to the optical path and directed toward the display surface and combined with the light from the primary light source and selectively reflected by the reflective spatial light modulator from the modulating side such that the combined light is brighter than the light from the primary light source and selectively reflected by the reflective spatial light modulator from the modulating side;

a set of LEDs configured to emit light that is directed to the backside of the reflective spatial light modulator, wherein the set of LEDs includes a first group of LEDs that emit white light and a second group of LEDs that emit light having a first color; and one or more drivers configured to drive the set of LEDs such that the relative intensity of the light emitted by the first group of LEDs and the second group of LEDs is configurable via a control signal, thereby facilitating the control signal to dictate the tone of the light emitted by the set of LEDs and transmitted through the reflective spatial light modulator.

2. The transflective display device of claim 1, wherein the tone of the light emitted by the set of LEDs and transmitted through the reflective spatial light modulator impacts the tone of the display of visual information generated on the display surface.

3. The transflective display device of claim 1, wherein the first color is amber.

4. The transflective display device of claim 1, wherein adjustment of the tone of light emitted by the set of LEDs does not impact the tone of the light emitted by the primary light source.

5. The transflective display device of claim 1, wherein the set of LEDs are arranged in a rectangle, and wherein along the sides of the rectangle individual ones of the LEDs in the first group of LEDs are interleaved with individual ones of the LEDs in the second group of LEDs.

6. The transflective display device of claim 5, wherein individual ones of the LEDs from the second set of LEDs arranged at or near corners of the rectangle are driven to emit light at an intensity relatively higher than the LEDs from the second set of LEDs along the sides of the rectangle to provide uniformity across the display surface in the tone of the light from the set of LEDs that is transmitted to the display surface.

7. The transflective display device of claim 6, wherein the LEDs from the second set of LEDs arranged along the individual sides of the rectangle are driven together, and wherein the LEDs from the set of LEDs that are arranged at or near the corners of the rectangle are driven separately from the LEDs from the second set of LEDs arranged along the individual sides of the rectangle.

8. The transflective display device of claim 5, wherein the LEDs from the first set of LEDs are driven together.

9. The transflective display device of claim 1, further including a user interface configured to receive user entry and/or selection of the tone of the light emitted by the set of LEDs such that the control signal that dictates the tone of the light emitted by the set of LEDs is generated based on the received user entry and/or selection of the tone of light.

10. The transflective display device of claim 1, wherein the reflective spatial light modulator is configured such that the display of visual information displayed on the display surface is monochromatic.

11. The transflective display device of claim 1, wherein the reflective spatial light modulator is a transflective liquid crystal device.

12. A method of using the transflective display device of claim 1, the method comprising:
receiving user input to adjust the relative intensity of the light emitted by the first group of LEDs and the second group of LEDs;
generating a control signal based on the user input;
transmitting the control signal to one or more drivers to adjust the relative intensity of the light emitted by the first group of LEDs and the second group of LEDs, thereby changing the tone of the light emitted by the set of LEDs and transmitted through the reflective spatial light modulator;
directing the light emitted by the set of LEDs to the backside of the reflective spatial light modulator;
spatially modulating the light received at the modulating side of the reflective spatial light modulator by selectively reflecting the light at separately addressable positions on the modulating side along the optical path toward the display surface; and
transmitting the light received at the backside of the reflective spatial light modulator through the backside and introducing it to the optical path, thereby directing it toward the display surface and combined with the light from the primary light source and selectively reflected by the reflective spatial light modulator from the modulating side such that the combined light is brighter than the light from the primary light source and selectively reflected by the reflective spatial light modulator from the modulating side.

13. The method of claim 12, wherein the tone of the light emitted by the set of LEDs and transmitted through the reflective spatial light modulator impacts the tone of the display of visual information generated on the display surface.

14. The method of claim 12, wherein the first color is amber.

15. The method of claim 12, wherein adjustment of the tone of light emitted by the set of LEDs does not impact the tone of the light from the primary light source.

16. The method of claim 12, wherein the set of LEDs are arranged in a rectangle, and wherein along the sides of the rectangle individual ones of the LEDs in the first group of LEDs are interleaved with individual ones of the LEDs in the second group of LEDs.

17. The method of claim 16, wherein individual ones of the LEDs from the second set of LEDs arranged at or near corners of the rectangle are driven to emit light at an intensity relatively higher than the LEDs from the second set of LEDs along the sides of the rectangle to provide uniformity across the display surface in the tone of the light from the set of LEDs that is transmitted to the display surface.

18. The method of claim 17, wherein the LEDs from the second set of LEDs arranged along the individual sides of the rectangle are driven together, and wherein the LEDs from the set of LEDs that are arranged at or near the corners of the rectangle are driven separately from the LEDs from the second set of LEDs arranged along the individual sides of the rectangle.

19. The method of claim 16, wherein the LEDs from the first set of LEDs are driven together, wherein the reflective spatial light modulator is configured such that the display of visual information displayed on the display surface is monochromatic, and wherein the reflective spatial light modulator is a transflective liquid crystal device.

20. The method of claim 12, further including receiving user entry and/or selection of the tone of the light emitted by the set of LEDs such that the control signal that dictates the tone of the light emitted by the set of LEDs is generated based on the received user entry and/or selection of the tone of light.

\* \* \* \* \*

UNITED STATES PATENT AND TRADEMARK OFFICE
CERTIFICATE OF CORRECTION

PATENT NO. : 12,292,652 B1
APPLICATION NO. : 18/584698
DATED : May 6, 2025
INVENTOR(S) : Anjan Katta et al.

Page 1 of 1

It is certified that error appears in the above-identified patent and that said Letters Patent is hereby corrected as shown below:

In the Claims

In Claim 1, Column 9, Line 1, please delete "and directed", therefor.

In Claim 12, Column 10, Lines 22-23, please delete "path, thereby directing it toward" and insert --path toward--, therefor.

Signed and Sealed this
Nineteenth Day of August, 2025

Coke Morgan Stewart
*Acting Director of the United States Patent and Trademark Office*